(12) United States Patent
Sainio et al.

(10) Patent No.: US 9,838,392 B2
(45) Date of Patent: Dec. 5, 2017

(54) METHOD AND APPARATUS FOR PROVIDING PROXY-BASED ACCESS CONTROLS

(75) Inventors: Miikka Johannes Sainio, Kerava (FI); Atte Lahtiranta, Bedford, MA (US)

(73) Assignee: Nokia Technologies Oy, Espoo (FI)

( * ) Notice: Subject to any disclaimer, the term of this patent is extended or adjusted under 35 U.S.C. 154(b) by 1214 days.

(21) Appl. No.: 13/071,151

(22) Filed: Mar. 24, 2011

(65) Prior Publication Data

US 2012/0222107 A1 Aug. 30, 2012

Related U.S. Application Data

(60) Provisional application No. 61/447,205, filed on Feb. 28, 2011.

(51) Int. Cl.
| | |
|---|---|
| G06F 15/16 | (2006.01) |
| H04L 29/06 | (2006.01) |
| G06F 21/55 | (2013.01) |
| G06F 21/56 | (2013.01) |
| H04W 12/08 | (2009.01) |

(52) U.S. Cl.
CPC ............ *H04L 63/10* (2013.01); *G06F 21/554* (2013.01); *G06F 21/56* (2013.01); *H04W 12/08* (2013.01)

(58) Field of Classification Search
CPC .......... G06F 21/31; G06F 21/83; G06F 21/53; G06F 21/6218
USPC ................. 713/153–155; 709/233, 223, 224; 726/12–16; 370/311
See application file for complete search history.

(56) References Cited

U.S. PATENT DOCUMENTS

| | | | |
|---|---|---|---|
| 7,412,228 B2 | 8/2008 | Barclay et al. | |
| 7,516,219 B2 | 4/2009 | Moghaddam et al. | |
| 2004/0098609 A1* | 5/2004 | Bracewell | H04L 63/068 726/6 |
| 2004/0166878 A1 | 8/2004 | Erskine et al. | |
| 2005/0198322 A1* | 9/2005 | Takabayashi et al. | 709/228 |
| 2008/0098463 A1* | 4/2008 | Wikman | H04L 63/0236 726/5 |
| 2008/0114862 A1* | 5/2008 | Moghaddam et al. | 709/220 |
| 2008/0172746 A1 | 7/2008 | Lotter et al. | |
| 2008/0246605 A1 | 10/2008 | Pfeffer et al. | |

(Continued)

FOREIGN PATENT DOCUMENTS

| | | |
|---|---|---|
| GB | 2 456 754 A | 7/2009 |
| WO | WO 2005/031544 A2 | 4/2005 |

(Continued)

OTHER PUBLICATIONS

International Search Report for PCT/FI2012/050167 dated Jun. 5, 2012, pp. 1-4.

(Continued)

*Primary Examiner* — Evans Desrosiers
(74) *Attorney, Agent, or Firm* — Ditthavong & Steiner, P.C.

(57) ABSTRACT

An approach is provided for proxy-based access controls. A proxy platform causes, at least in part, designation of at least one monitoring client of a proxy server. The proxy platform receives an input for associating one or more accessing clients with the at least one monitoring client. The at least one monitoring client manages access to one or more resources of the proxy server by the one or more accessing clients.

18 Claims, 9 Drawing Sheets

(56) References Cited

U.S. PATENT DOCUMENTS

| | | | |
|---|---|---|---|
| 2009/0210545 A1* | 8/2009 | Wright | H04L 67/104 709/230 |
| 2010/0057830 A1 | 3/2010 | Takala | |
| 2011/0065419 A1 | 3/2011 | Book et al. | |
| 2012/0117641 A1* | 5/2012 | Holloway | G06Q 30/0241 726/12 |

FOREIGN PATENT DOCUMENTS

| | | |
|---|---|---|
| WO | WO 2008/047223 A2 | 4/2008 |
| WO | WO 2009/098538 A1 | 8/2009 |
| WO | WO 2010/035281 A1 | 4/2010 |

OTHER PUBLICATIONS

International Written Opinion for PCT/FI2012/050167 dated Jun. 5, 2012, pp. 1-8.

"AllegroSurf—The Premiere Internet Content Filtering Proxy Server for Windows," Rhino Software, Inc., 2011.

"Parental Controls," Adaptive Mobile, 2011 (http://www.adaptivemobile.com/product-portfolio/personalised-protection/parental-controls).

Purohit, "Office Efficiencies (India) Pvt. Ltd. (SafeSquid)," Aug. 19, 2010.(http://community.partnerpedia.com/companies/2435/contents/1093).

Yao et al., "Proxy-based Recovery for Applications on Wireless Hand-held Devices," IEEE, 2000, pp. 2-10.

* cited by examiner

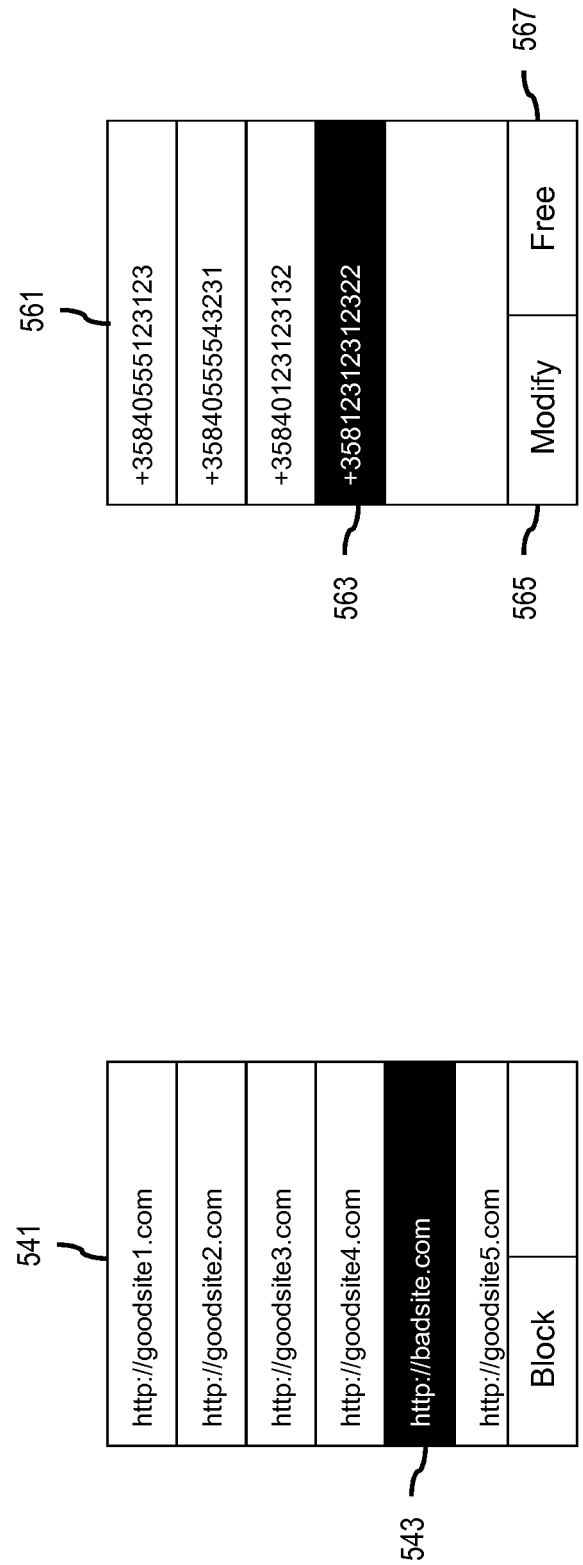

METHOD AND APPARATUS FOR PROVIDING PROXY-BASED ACCESS CONTROLS

RELATED APPLICATIONS

This application claims the benefit of the earlier filing date under 35 U.S.C. §119(e) of U.S. Provisional Application Ser. No. 61/447,205 filed Feb. 28, 2011, entitled "Method and Apparatus for Providing Proxy-based Access Controls," the entirety of which is incorporated herein by reference.

BACKGROUND

Wireless (e.g., cellular) service providers and device manufacturers are continually challenged to deliver value and convenience to consumers by, for example, providing compelling network services, applications, and content. In light of an increasingly web-centric culture, one emerging service is the use of wireless devices to access mobile web services. However, limited resources (e.g., bandwidth, processing power, availability of the mobile web server) within the wireless environment can limit access to these web services on mobile devices. Accordingly, service providers and device manufacturers face significant technical challenges to overcome such limitations by enabling efficient and secure access to web services via, for instance, a proxy server.

Some Exemplary Embodiments

Therefore, there is a need for an approach for providing a proxy-based access controls to reduce, for instance, risks resulting from access of potentially malicious web services.

According to one embodiment, a method comprises causing, at least in part, designation of at least one monitoring client of a proxy server. The method also comprises receiving an input for associating one or more accessing clients with the at least one monitoring client. The at least one monitoring client manages access to one or more resources of the proxy server by the one or more accessing clients.

According to another embodiment, an apparatus comprises at least one processor, and at least one memory including computer program code, the at least one memory and the computer program code configured to, with the at least one processor, cause, at least in part, the apparatus to designate at least one monitoring client of a proxy server. The apparatus is also caused to receive an input for associating one or more accessing clients with the at least one monitoring client. The at least one monitoring client manages access to one or more resources of the proxy server by the one or more accessing clients.

According to another embodiment, a computer-readable storage medium carries one or more sequences of one or more instructions which, when executed by one or more processors, cause, at least in part, an apparatus to designate at least one monitoring client of a proxy server. The apparatus is also caused to receive an input for associating one or more accessing clients with the at least one monitoring client. The at least one monitoring client manages access to one or more resources of the proxy server by the one or more accessing clients.

According to another embodiment, an apparatus comprises means for causing, at least in part, designation of at least one monitoring client of a proxy server. The apparatus also comprises means for receiving an input for associating one or more accessing clients with the at least one monitoring client. The at least one monitoring client manages access to one or more resources of the proxy server by the one or more accessing clients.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5D are diagrams of user interfaces utilized in the processes of FIGS. 1-4, according to various embodiments;

DESCRIPTION OF PREFERRED EMBODIMENT

A method and apparatus for providing proxy-based access controls are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to providing proxy-based access controls within a wireless network environment, it is contemplated that the various embodiments of the approach described herein may be used within any type of communication system or network and with any mode of communication available of the network (e.g., data communications, Internet communication, voice communication, text communication, etc). In addition, although the various embodiments are further described with respect to mobile devices, it is contemplated that the various embodiments are applicable to any type of device with network access (e.g., stationary terminals, personal computers, etc.).

Figure 1:
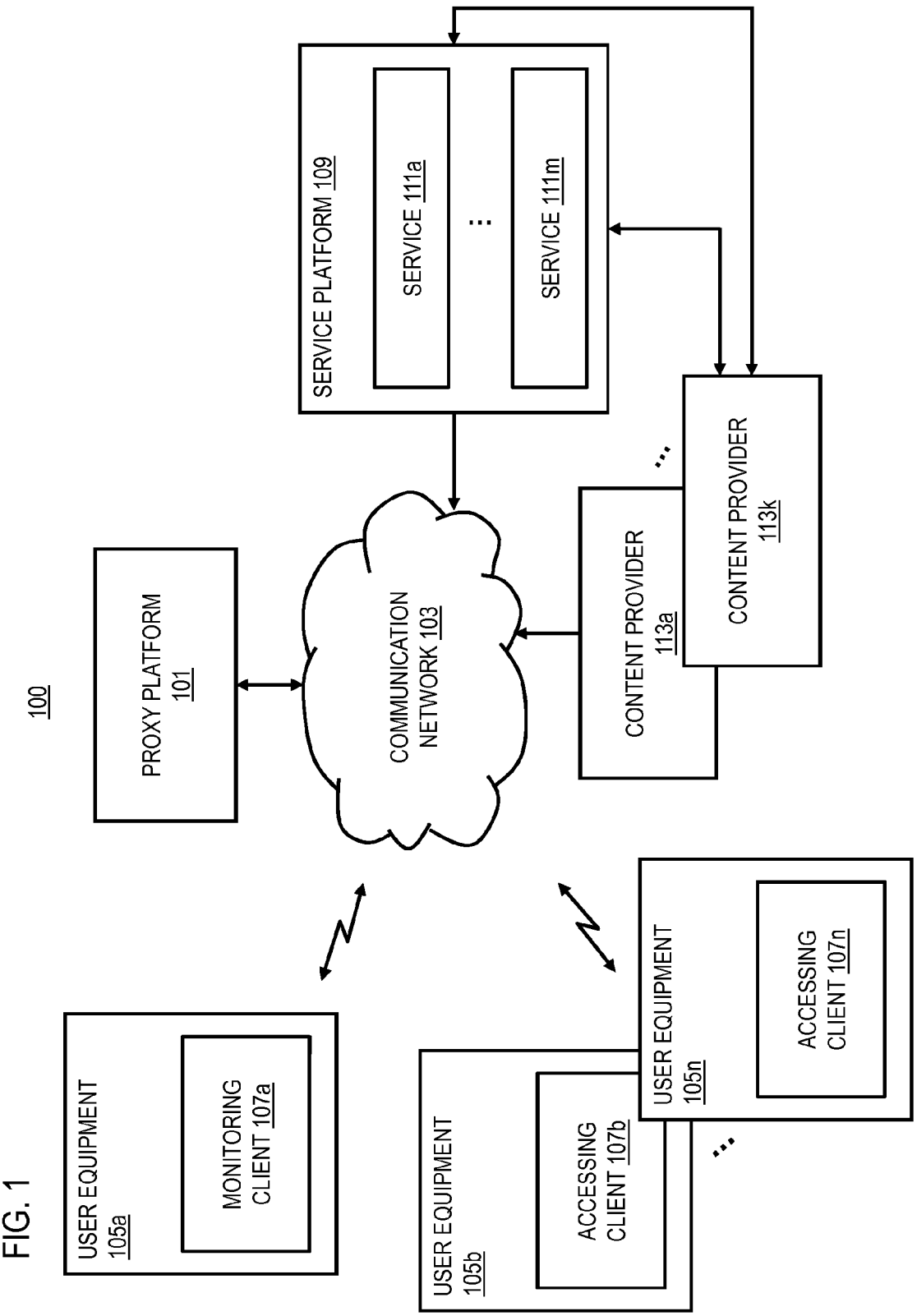
FIG. 1 is a diagram of a communication system capable of providing proxy-based access controls, according to one embodiment.

FIG. 1 is a diagram of a communication system capable of providing proxy-based access controls, according to one embodiment. As discussed previously, implementing mobile web services within a wireless environment can potentially tax the relatively limited resources (e.g., bandwidth, processing power, memory, etc.) that are available within the environment (e.g., within a mobile device). Moreover, use of such services to access content over the Internet can potentially expose devices to potential risks (e.g., security risks, privacy risks, etc.). For example, the Internet can contain or otherwise provide access to risks such as phishing or other fraudulent attacks, questionable material, as well as to malicious web sites that aim to, for instance, acquire sensitive information from the a user device, crash the browser or device, and/or perform other malicious acts. Similarly, access to other communication endpoints or resources (e.g., telephone numbers, premium text messaging services, chat services, etc.) accessible over a communication network can also be used as vehicles for such malicious purposes.

As a result, devices can be vulnerable to a myriad number of risks present within modern communication networks. Historically, devices can use protective measures such as anti-malware programs, anti-virus programs, and the like, but these traditional solutions can be quite resource intensive to operate, particularly in mobile devices with limited resources. Furthermore, such solutions can be slow to respond to quickly emerging threats.

In addition, communication networks such as the Internet can potentially contain a considerable amount of questionable material, particularly for audiences such as you children. By way of example, such objectionable material includes pornography, violence, obscene content, age-restricted sites, and the like. In some cases, certain services (e.g., social networking services, chat services, etc.) may also not be suitable for use by younger children. Accordingly, service providers and device manufacturers face technical challenges to enabling, for instance, parents to supervise their children's access to various resources or communication endpoints within a communication network.

To address these problems, a system 100 of FIG. 1 introduces a capability to provide proxy-based access controls that can be managed by one or more clients (e.g., monitoring clients) of a proxy platform 101 (e.g., a proxy server) to control access to resources or communications endpoints of the proxy platform 101 and/or a communication network 103 by one or more other clients (e.g., accessing clients). More specifically, in one embodiment, the system 100 enables the proxy platform 101 to designate at least one monitoring client. The designated monitoring client can then define access policies, rules, lists (e.g., blacklists, whitelists, gray lists, etc.) that are enforced by the proxy platform 101. By way of example, enforcement includes determining whether accessing clients that are associated with the monitoring client are permitted to access one or more communication endpoints or resources accessible via the proxy platform 101. For example, in one use case, the monitoring client can be associated with devices (e.g., user equipment (UE) 105*a*) of parental users (or other entities who wish to control access by other clients) and the accessing clients are associated with devices of child users (e.g., UEs 105*b*-105*n*).

As shown in FIG. 1, the system 100 includes a proxy browsing architecture which consists of at least one monitoring client 107*a* executing on the UE 105*a* and one or more accessing clients 107*b*-107*n* executing respectively on the UEs 105*b*-105*n*. In one embodiment, the monitoring client 107*a* and the accessing clients 107*b*-107*n* can be a common proxy client that provides both monitoring and accessing capabilities. Accordingly, the monitoring clients 107*a* and the accessing clients 107*b*-107*n* can be collectively referred to as proxy clients 107. In one embodiment, the proxy clients 107 route at least a portion of the communication traffic from the UEs 105 through the proxy platform 101. In some embodiments, the proxy clients 107 may be a browser application. In addition or alternatively, the proxy clients 107 can be independent processes executing in the UEs 105, or can be incorporated in other applications executing in the UEs 105.

In one embodiment, the proxy platform 101 receives requests from the proxy clients 107 to route communication traffic to the intended communication endpoints (e.g., websites, services, applications, etc. available over the communication network 103) or access one or more resources (e.g., access histories, policies, access lists, etc.) of the proxy platform 101. In addition, the proxy platform 101 can route return communication traffic from the communication endpoints to the any of the proxy clients 107 and/or UEs 105. By way of example, the communication endpoints can include a service platform 109, the services 111*a*-111*m* (also collectively referred to as services 111), the content providers 113a-113k (also collectively referred to as content providers 113), or any other component with connectivity to the communication network 103 (e.g., another UE 105). For example, the service platform 109, the service 111, and/or the content providers 113 may provide any number of services (e.g., mapping services, social networking services, media services, content services, etc.) via a web server or other means of communications (e.g., text messaging, voice, instant messaging, chat, etc.). In other words, the communication endpoints represent a terminating point of communications from the proxy clients 107, and an originating point of communications to the proxy clients 107.

In some embodiments, in addition to various embodiments of the access control processes described herein, the proxy platform 101 can perform any number of communications related functions for routing and/or processing communication traffic. For example, the proxy platform 101 may compress or otherwise modify content that is to be delivered to the proxy clients 107 based, at least in part, on one or more capabilities or characteristics of the receiving UE 105. For example, in wireless environments, the proxy platform 101 can compress data for more efficient transmission, transform content to reduce the amount of data for transfer, reformat content for display in smaller screens, etc.

In one embodiment, at least one group of the proxy clients 107 are designated as either monitoring clients 107 or accessing clients 107. As used herein, the term "monitoring clients 107" refer to proxy clients 107 that can manage or control access to communication endpoints or resources of the proxy platform 101 by other proxy clients 107. The accessing clients 107 are the proxy clients 107 that are subject to the controls of one or more of the monitoring clients 107. In other words, in one embodiment, the accessing clients 107 can access communication endpoints or resources via the proxy platform 101 only to the extent permitted by the policies or approval of the monitoring clients 107.

In one embodiment, the monitoring clients 107 include, at least in part, functions and/or controls for monitoring the accessing clients 107. By way of example, the functions include, at least in part: (1) defining access policies, access lists (e.g., blacklists, whitelists, gray lists, etc.); (2) monitoring access histories (e.g., communication records, web histories, etc.) of the accessing clients 107; (3) monitoring context information (e.g., location, activity, device resources available, device resources consumed, etc.) of the accessing clients 107; and the like.

In addition, the accessing clients 107 include, at least in part, functions and/or controls for accessing communication endpoints and resources (e.g., web resources) via the proxy platform 101. In one embodiment, the functions include, at least in part, requesting access to web resources from the monitoring clients 107 and/or the proxy platform 101. In one embodiment, the proxy platform 101 performs the one or more functions listed above to enforce access controls defined by the monitoring clients 107 for application to the accessing clients 107.

In one embodiment, the monitoring clients 107 and/or the proxy platform 101 can obtain access information for generating the access lists and/or access policies to apply to the accessing clients 107 by using crowd-sourcing (e.g., access information gathered from other UEs 105 and/or their respective users). For example, through crowd-sourcing the access information, the system 100 can quickly respond to new threats or conditions, and also reduce resource burdens (e.g., operational expense, computation resources, etc.) associated with operating a completely managed system. As used herein, access information includes identification of one or more communication endpoints, the access behavior that has been or is to be associated with the communication endpoint, descriptions of the communication endpoints, characteristics of the communication endpoints, and/or any other information that can indicate potential risks or objectionable content (e.g., pornography, violence, obscenity, etc.) associated with the communication endpoints. For example, the access information may include flags indicating that a particular endpoint (e.g., website) is malicious, spreads malware, infected with one or more viruses, is age-restricted, contains objectionable material, etc. In one embodiment, the monitoring clients 107 can then define access policies that prohibit or otherwise restrict the accessing clients 107 from accessing such potentially malicious or objectionable sites.

In one embodiment, the reported access information can be verified by access information received from other users. For example, the system 100 may only use access information that has been reported by multiple UEs 105 or users. In addition, the system 100 enables user to report on the accuracy of previously reported access information. For example, other users relying on the access information can give feedback or a rating of the information.

In one embodiment, in addition to crowd sourcing, objectionable or inappropriate material can be defined by one or more users associated with the monitoring clients 107. For example, a parent who is using a monitoring client 107 to control access for one or more children through the children's respective accessing clients 107 on respective devices (e.g., the UEs 105) can specify individual addresses or identifiers of communication endpoints or resources (e.g., websites, phone numbers, etc.) for which access is either permitted, not permitted, permitted only after approval, etc.

In addition or alternatively, identification of objection material including related access policies or access lists may be provided by or obtained from third party providers (e.g., the services 111 and/or content providers 113) or preinstalled on the proxy platform 101. For example, an organization may maintain a blacklist of objectionable, malicious, fraudulent or otherwise risky communication endpoints and/or resources. In one embodiment, the monitoring clients 107 can specify use of these third party lists or access information as default blacklists. Then, as the monitoring clients 107 begin generating and reporting their own access information, they can customize or replace portions of the default blacklists. The customized blacklists (e.g., customized for the accessing clients 107) can then be stored at the proxy platform 101 for enforcement to control access to proxy-mediate resources or communication endpoints by the accessing clients 107.

By way of example, the UE 105 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 105 can support any type of interface to the user (such as "wearable" circuitry, etc.).

Additionally, the communication network 103 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

Communication is facilitated between the UE 105 and the proxy platform 101 via the communication network 103 using well known, new or still developing protocols. In this context, a protocol includes a set of rules defining how the network nodes within the communication network 103 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the proxy clients 107 and the proxy platform 101 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
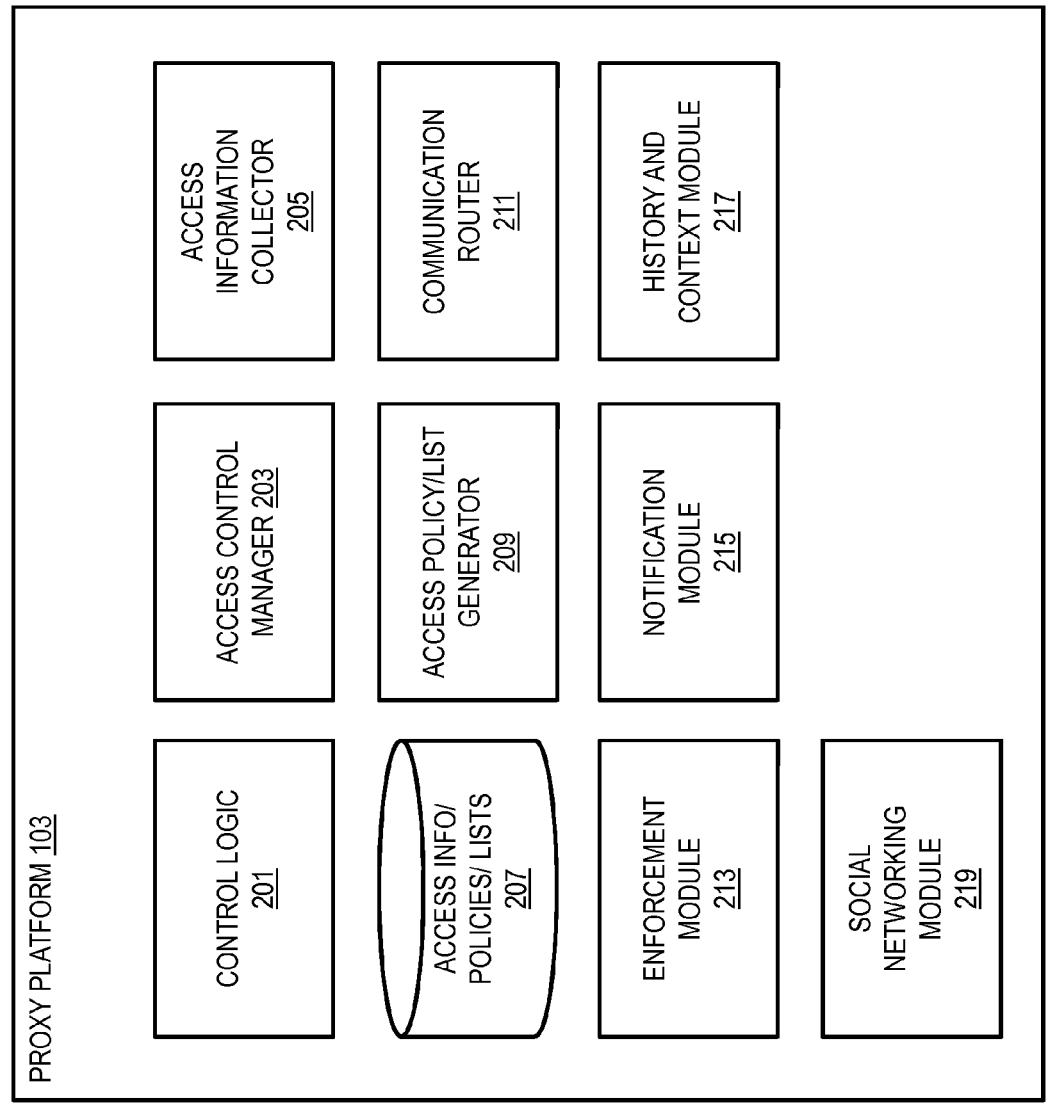
FIG. 2 is a diagram of components of a proxy platform, according to one embodiment.

FIG. 2 is a diagram of components of a proxy platform, according to one embodiment. By way of example, the proxy platform 101 includes one or more components for providing proxy-based access controls. It is contemplated that the functions of these components may be combined in one or more components or performed by other components of equivalent functionality. In this embodiment, the proxy platform 101 includes a control logic 201, an access control manager 203, an access information collector 205, an access information/policies/list database 207, an access policy/list generator 209, a communication router 211, an enforcement module 213, a notification module 215, a history and context module 217, and a social networking module 219.

More specifically, the control logic 201 executes at least one algorithm for performing one or more functions of the proxy platform 101. For example, the control logic 201 interacts with the access control manager 203 to identify proxy clients 107 that intend to form a group for managed access control via the proxy platform 101. From among the identified proxy clients 107, the proxy platform 101 designates one or more monitoring clients with the remaining clients 107 of the group designated at accessing clients 107. In one embodiment, the proxy clients 107 identify themselves to the proxy platform 101 using, for instance, and text message sent to the proxy platform 101. The proxy platform 101 can then parse the text message to determine identifiers (e.g., phone numbers) associated with the respective clients 107 for identification. In some embodiment, the text message may contain authentication credentials to ensure that only authorized proxy clients 107 can join the group. In addition, the authentication credentials can also ensure that any proxy clients 107 that are designated to as the monitoring clients 107 has the authority and/or rights to manage access controls for the accessing clients 107. For example, in one use case, the authentication credentials may be used to check whether the monitoring client 107 is a primary device in a group account including other devices executing the accessing clients 107. It is contemplated that any authentication credentials or authentication means can be used to ensure that only authorized proxy clients 107 (e.g., including both monitoring clients 107 and accessing clients 107) are able to participate in the managed access process discussed with respect to the various embodiments of the approach described herein.

Next, the access control manager 203 interacts with the access information collector 205 to receive or otherwise determine access information from, for instance, the monitoring clients 107. As previously described, access information includes information that provides, at least in part, indications of whether access to one or more communications points are to granted, denied, or otherwise restricted. For example, access information may include flags indicating whether a particular communication endpoint or resource (e.g., a website, a phone number, a test messaging number, etc.) is associated with objectionable material, malicious content, fraudulent content, and/or other potential risks. In addition or alternatively, access information may include experience that indicates one or more communication endpoints or resources are free or substantially free from known threats. By way of example, the access information collector 205 may store all or a portion of the collected access information in the access information/policies/lists database 207.

The access information collector 205 can then interact with the access policy/list generator 209 to process the collected access information for generating one or more access policies or lists. For example, for communication endpoints or resources that are specified in the access information, the access policy/list generator 209 can determine access recommendations such as whether a particular communication endpoint or resource is malicious or objectionable and then determine an appropriate access policy. For example, if a communication endpoint meets criteria (e.g., reported as objectionable or malicious by the monitoring clients 107, reported as objectionable or malicious by more than a predetermined number of other users, reported as free from threats by more than a predetermined number of users, demonstrated to have caused harm to a proxy client 107 or UE 105, etc.), then a corresponding access policy is applied (e.g., deny access to a communication endpoint, provide warnings before allowing access, etc.). In addition or alternatively, the access policies/lists can also be specified by the monitoring clients 107 and/or their respective users. These policies can be stored, at least in part, in the access information/policies/lists database 207.

In one embodiment, the access policy/list generator 209 can generate access lists (e.g., blacklists to deny access, whitelists to enable access, gray lists to warn before determining access) with respect to the communication endpoints. For example, the access policy/list generator 209 may create or compile a blacklist of endpoints that pose an objection or threat level above a threshold value. Entry in the blacklist of a communication endpoint can result in denial of access to that endpoint. Similarly, the access policy/list generator 209 can generate whitelists of endpoints that have been reported to pose no threat or a threat level below a threshold value. Entry in the whitelist of a communication endpoint can, for instance, enable communication with the endpoint without restriction from the proxy platform 101. In another embodiment, the access policy/list generator 209 can generate gray lists to cover communication endpoints that may have at least some of level of potential threat. Entry in the gray list of a communication endpoint can, for instance, result in presentation notification of potential threats to enable the user to make a final access decision with respect to a particular endpoint. In one embodiment, the access policy/list generator 209 can store the access lists in the access information/policies/list database 207.

In another embodiment, the access policy/list generator 209 can retrieve or otherwise obtain premade access lists or policies from a third party source (e.g., the services 111, the content providers 113, the service platform 109, etc.). As previously noted, the third party lists or policies may be used when access information is incomplete or unavailable. For example, the third party access lists or policies can apply to communication endpoints or resources that have not yet been visited by the proxy clients 107.

In one embodiment, the access policy/list generator 209 can determine different policies and/or lists for different accessing clients 107. In this way, the monitoring clients 107 can specify individual access policies for each of the accessing clients 107. In some embodiments, the monitoring clients 107 can also specify access policies or lists that apply to all accessing clients 107 under their respective authorities. It is contemplated, that the proxy platform 101 can support both common and individualized policies/lists or a combination thereof.

In another embodiment, the monitoring clients 107 may specify one or more criteria (e.g., context information) for the access policies or lists. In this way, the proxy platform 101 may apply policies based on the context information associated with the accessing clients 107 and/or their respective UEs 105 or users. For example, the monitoring client 107 may apply policies that limit access based, at least in part, on time, location, activity, etc. associated with the accessing clients 107.

Once the access policies or lists are available, the communication router 211 begins monitoring communication requests and other traffic through the proxy platform 101 to determine whether the requests or traffic relate any accessing clients 107 and/or related policies or lists. If any policies or lists are applicable, the communication router 211 interacts with the enforcement module 213 to grant, deny, or restrict access to the one or more communication endpoints or resources by the accessing clients 107 based, at least in part, on the policies or lists. Based on the applicable access policies or lists, the enforcement module 213 can interact with the notification module 215 to present notifications to the monitoring clients 107 and/or the accessing clients 107 regarding any access information, policy, or list that might apply to the accessing clients 107's requests to access one or more communication endpoints or resources via the proxy platform 101.

In one embodiment, the history and context module 217 can record and store the access histories of the accessing clients 107. For example, the access histories include, at least in part, a web history, a call history, a text messaging history, a bandwidth usage history, and the like of the one or more accessing clients. The context information can be any context associated with the accessing clients 107 and/or their respective UEs 105 including, at least in part, a location, activity, device capabilities, etc. of the accessing clients 107. The history and context module 217 can then provide access to the histories and/or context information to the monitoring clients 107. In one embodiment, the monitoring clients 107 can then further refine the access policies and/or lists based, at least in part, on the histories and/or context information.

As shown, the proxy platform 101 also includes the social networking module 219 to filter the access information, policies, or lists based, at least in part, on one or more social networks associated with the monitoring clients 107, the accessing clients 107, and/or the respective users. In this way, a user can limit the crowd-sourced access information to information collected from social network contacts that may have more trusted relationships with the users of the monitoring clients 107 and/or the accessing clients 107. In this way, the access policies and lists can be more specifically tailored for the accessing clients 107 without the monitoring clients 107 and/or the accessing clients 107 having, for instance, to manually specify or override any determined policies or lists.

Figure 3:
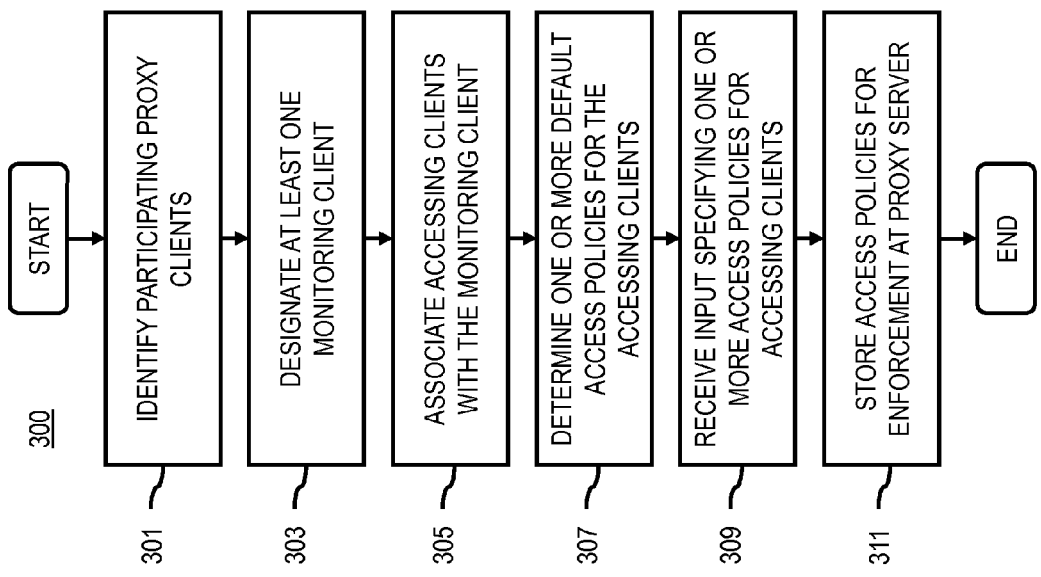
FIG. 3 is a flowchart of a process for initiating proxy-based access controls, according to one embodiment.

FIG. 3 is a flowchart of a process for generating proxy-based access policies or lists, according to one embodiment. In one embodiment, the proxy platform 101 performs the process 300 and is implemented in, for instance, a chip set including a processor and a memory as shown FIG. 7. In step 301, the proxy platform 101 identifies one or more proxy clients 107 for participation in the managed access control process discussed with respect to various embodiments of the approach described herein. As noted above, the proxy platform 101 can receive a text message, an account name, a unique identifier, or a combination thereof to identify the monitoring clients 107, the accessing clients 107, or a combination thereof at the proxy platform 101.

Next, the proxy platform 101 causes, at least in part, designation of at least one of the participating proxy clients 107 as a monitoring client 107 of the proxy platform 101 (step 303). The proxy platform 101 then receives an input (e.g., from the monitoring client 107) for associating one or more accessing clients 107 with the designated monitoring client or clients 107 (step 305). In one embodiment, the accessing clients 107 can be selected from the remaining ones of the proxy clients 107 that are not designated as monitoring clients 107. In one embodiment, the monitoring clients 107 and the accessing clients 107 are peer clients of the proxy platform 101.

In step 307, the proxy platform 101 determines one or more default access policies or lists to apply to the accessing clients 107. As previously discussed, the proxy platform 101 may include one or more default policies for minimizing exposure to objectionable and/or malicious content accessible via the proxy platform 101. In some embodiments, the proxy platform 101 processes and/or facilitates a processing of access information (e.g., received from the monitoring clients 107 and/or the accessing clients 107) to generate the one or more access policies, wherein access to one or more communication endpoints or resources by the accessing clients 107 is provided based, at least in part, on the one or more access policies.

As part of this process, the proxy platform 101 can also cause, at least in part, a generation of one or more access lists, including, at least in part, blacklists, one or more whitelists, one or more gray lists, or a combination thereof regarding the one or more communication endpoints. In one embodiment, the proxy platform 101 can generate the one or more access policies based, at least in part, on the one or more access lists. In other words, the one or more access policies can apply rules for enforcing the one or more access lists at the proxy platform 101.

In another embodiment, the proxy platform 101 receives an input, from the at least one monitoring client, for specifying one or more access policies, one or more access lists, or a combination thereof with respect to the one or more resources (step 309). The access information, access policies, and/or access lists can then be stored (e.g., in the access information/policies/lists database 207) for later use (e.g., enforcement) at the proxy platform 101 (step 311).

Figure 4:
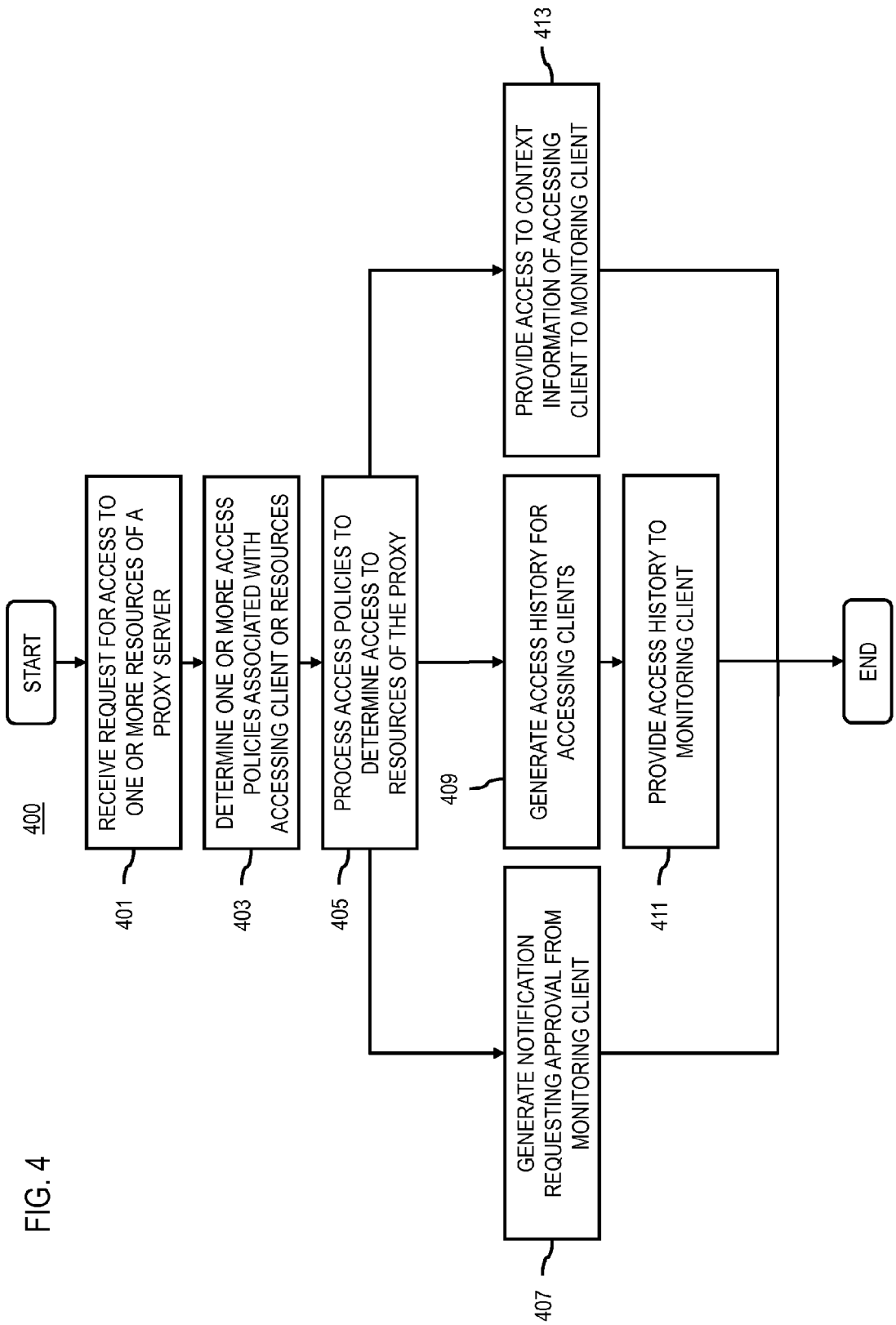
FIG. 4 is flowchart of a process for providing proxy-based access controls, according to one embodiment.

FIG. 4 is flowchart of a process for enforcing proxy-based access policies or lists, according to one embodiment. In one embodiment, the proxy platform 101 performs the process 400 and is implemented in, for instance, a chip set including a processor and a memory as shown FIG. 7. The example of FIG. 4 assumes that the process 300 of FIG. 3 has been completed to designate the monitoring clients 107 and the accessing clients 107, and to generate one or more access policies or access lists for the accessing clients 107 for enforcement at the proxy platform 101.

In step 401, the proxy platform 101 receives a request, from the one or more accessing client 107, for access to at least one communication endpoint or resource via the proxy platform 101. In this example, at least a portion of the communication traffic between the one or more accessing clients 107 and one or more communication endpoints or resources is routed through the proxy platform 101. Accordingly, the request can be indicated by an accessing client 107, for instance, entering a web address, dialing a phone number, texting to a phone number, initiating a chat session, etc. with respect to a communication endpoint or resource. In this case, the communication endpoint is any communication device (e.g., server, device, component, etc.) with connectivity to the proxy platform 101 and/or the communication network 103. Similarly, a resource is any content, service, application, etc. available from the communication endpoint or other component of the communication network 103. In one embodiment, access to the communication endpoint and/or resource is provided through the proxy platform 101.

Next, the proxy platform 101 determines or otherwise obtains one or more access policies, access lists (e.g., blacklists, whitelists, gray lists, etc.), or the like associated with the accessing clients 107 and/or the one or more communication endpoints or resources referenced in the communication request (step 403). The proxy platform 101 then processes and/or facilitates a processing the one or more access policies/lists, one or more default access policies/list, or a combination thereof to determine whether to grant or deny the request for access by the accessing clients 107 (step 405). In this way, the proxy platform 101 can enforce policies to reduce potential threat exposure to the accessing clients 107 without having to transmit potentially risky information to the requesting device.

Following enforcement of the policies of the monitoring clients 107 on the accessing clients 107, the proxy platform 101 can perform additional actions depending on the one or more policies. For example, in step 407, the proxy platform 101 can generate a notification to the at least one monitoring client 107 requesting an approval for the request for access from the accessing client 107. The proxy platform 101 then makes the determination of whether to grant or deny the access request based, at least in part, on the approval from the monitoring client 107. In one embodiment, the proxy platform 101 may generate the approval request based, at least in part, on a request from the accessing client 107. For example, if the accessing client 107 is denied access to a particular communication endpoint or resource, the accessing client 107 initiate the request to approve the access by the monitoring client 107.

In another example action, the proxy platform 101 can generate respective access histories for the one or more accessing clients 107 (step 409). As discussed previously, the access histories include, at least in part, a web history, a call history, a text messaging history, a bandwidth usage history, or a combination thereof. The proxy platform 101 can then determine to provide access to the respective access histories to the at least one monitoring client 107 via the proxy platform 101 (step 411). In this way, the monitoring clients 107 can monitor what types of communications the accessing clients 107 have already conducted via the proxy platform 101.

In yet another example action, the proxy platform 101 can determine to provide access to context information associated with the one or more accessing clients to the at least one monitoring client via the proxy platform 101 (step 413). In this way, the monitoring clients 107 can monitor, for instance, a location, an activity, etc. associated with the accessing clients 107. By way of example, the proxy platform 101 may provide access to this information via a web portal, a client application, and the like. For example, in one use case, the proxy platform 101 may present the location of the accessing clients 107 in a mapping user interface.

Figure 5B:
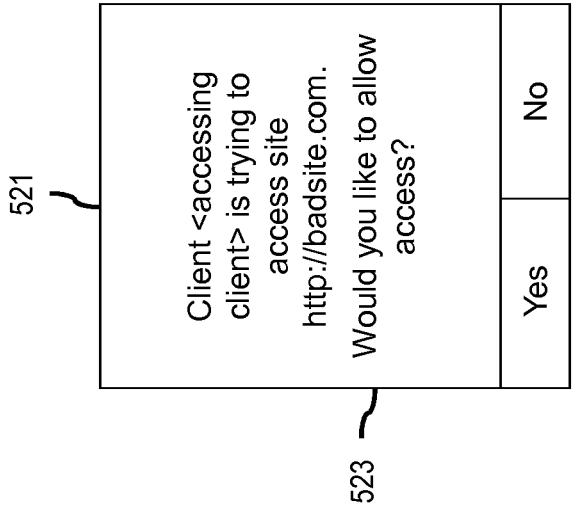
Figure 5A:
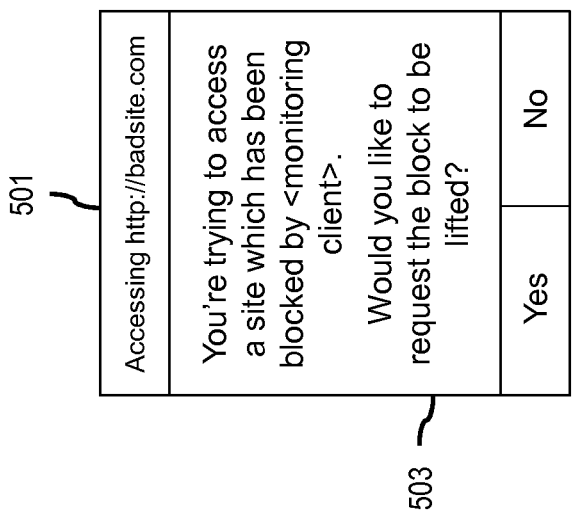

FIGS. 5A-5D are diagrams of user interfaces utilized in the processes of FIGS. 1-4, according to various embodiments. FIG. 5A depicts an example where an accessing client 107 has requested access via the proxy platform 101 to access a website, "http://badsite.com", that has been blacklisted by a monitoring client 107. In this example, on receiving the request to access the blacklisted site, the proxy platform 101 notifies the accessing client in the user interface 501 that "You're trying to access a site which has been blocked by <monitoring client>". The UI 501 also provides an option 503 for the accessing client 107 to request that the monitoring client 107 life the block on the on the requested website.

FIG. 5B depicts a UI 521 that notifies a user of the monitoring client 107 that an accessing client is attempting to access the website, "http://badsite.com", which has been blacklisted by the monitoring client 107. The UI 521 provides an option 523 for the monitoring site to allow access by the accessing client 107 and override the access policy or list which blocked the website. If the user selects to allow access, the monitoring client 107 notifies the proxy platform 101 to modify the list or policy blocking the access. The proxy platform 101 can proceed with the modification to allow the access by the accessing client 107. In one embodiment, the access approval can be applied temporarily just for this particular request or permanently for all subsequent requests to access the website via the proxy platform 101.

FIG. 5C depicts an example where the proxy platform 101 has enabled the monitoring client 107 to access a browsing history of an accessing client 107. As shown, a UI 541 presents a list of sites recently visited or access the accessing client 107. The user of the monitoring client 107 can examine the browsing history and block or otherwise restrict access to specific sites on the list. In this example, the user of the monitoring client 107 selects the website 543, "http://badsite.com", in the browsing history to block. In response, the monitoring client 107 sends a request to the proxy platform 101 to block further access to the website 543 by the accessing client 107.

FIG. 5D depicts a UI 561 that presents a list of accessing clients 107 under the control of a monitoring client 107. In this example, the accessing clients 107 are identified based on their respective phone numbers. Through the UI 561, a user of the monitoring client 107 can select an accessing client 563 and then select an option 565 to modify access policies/lists associated with the accessing client 563. In addition, the UI 561 provides an option 567 to "free" the accessing client 563 for further access controls or management by the monitoring client 107. More specifically, by selecting the free option 567, the accessing client 563 is no longer associated with the monitoring client 107 for access control or management. In one embodiment, the UI 561 also enables the user of the monitoring client 107 to add additional accessing clients 107 for management or administration.

The processes described herein for providing proxy-based access controls may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
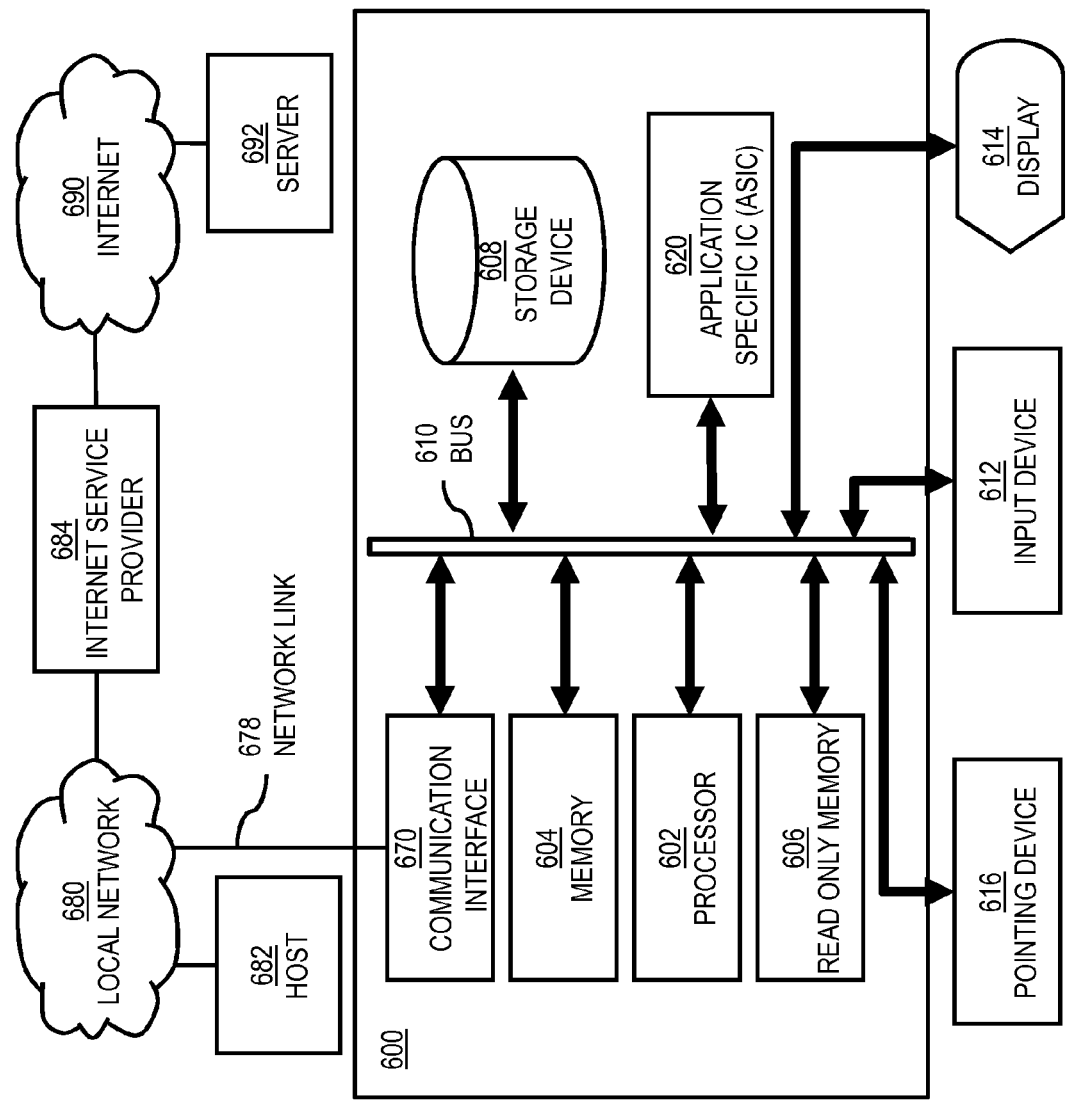
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide proxy-based access controls as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing proxy-based access controls.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to providing proxy-based access controls. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing proxy-based access controls. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing proxy-based access controls, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 103 for providing proxy-based access controls to the UE 105.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
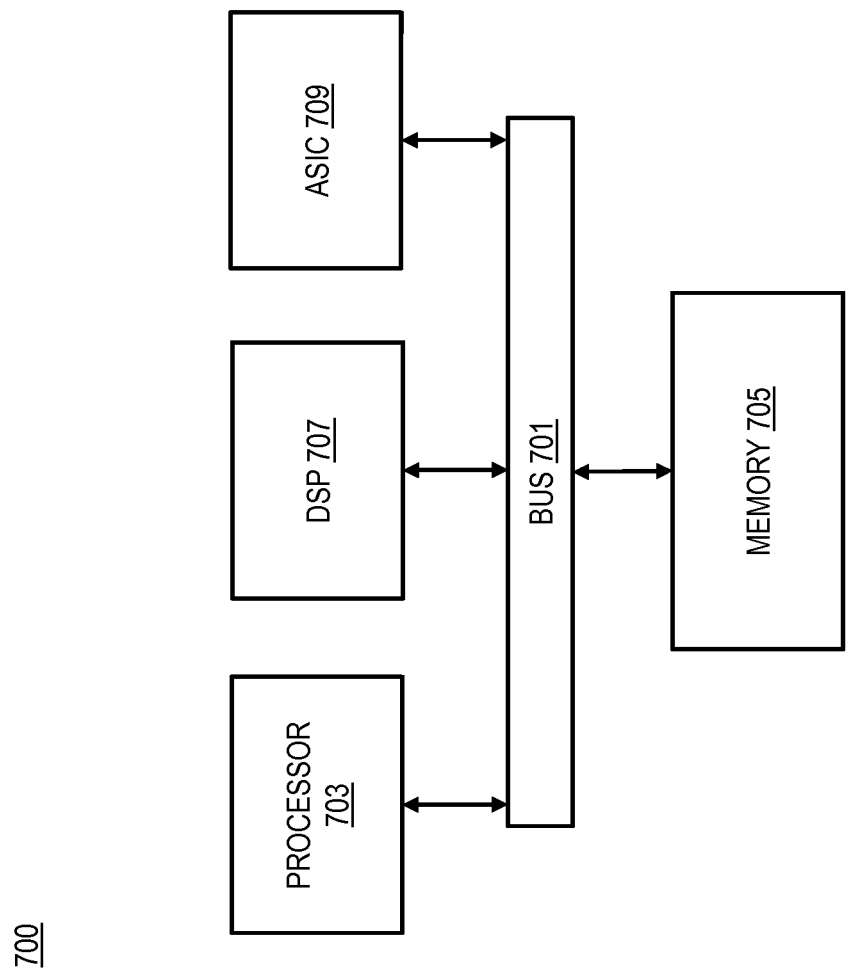
FIG. 7 is a diagram of a chip set that can be used to implement an embodiment of the invention.

FIG. 7 illustrates a chip set or chip 700 upon which an embodiment of the invention may be implemented. Chip set 700 is programmed to provide proxy-based access controls as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing proxy-based access controls.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide proxy-based access controls. The memory 705 also stores the data associated with or generated by the execution of the inventive steps.

Figure 8:
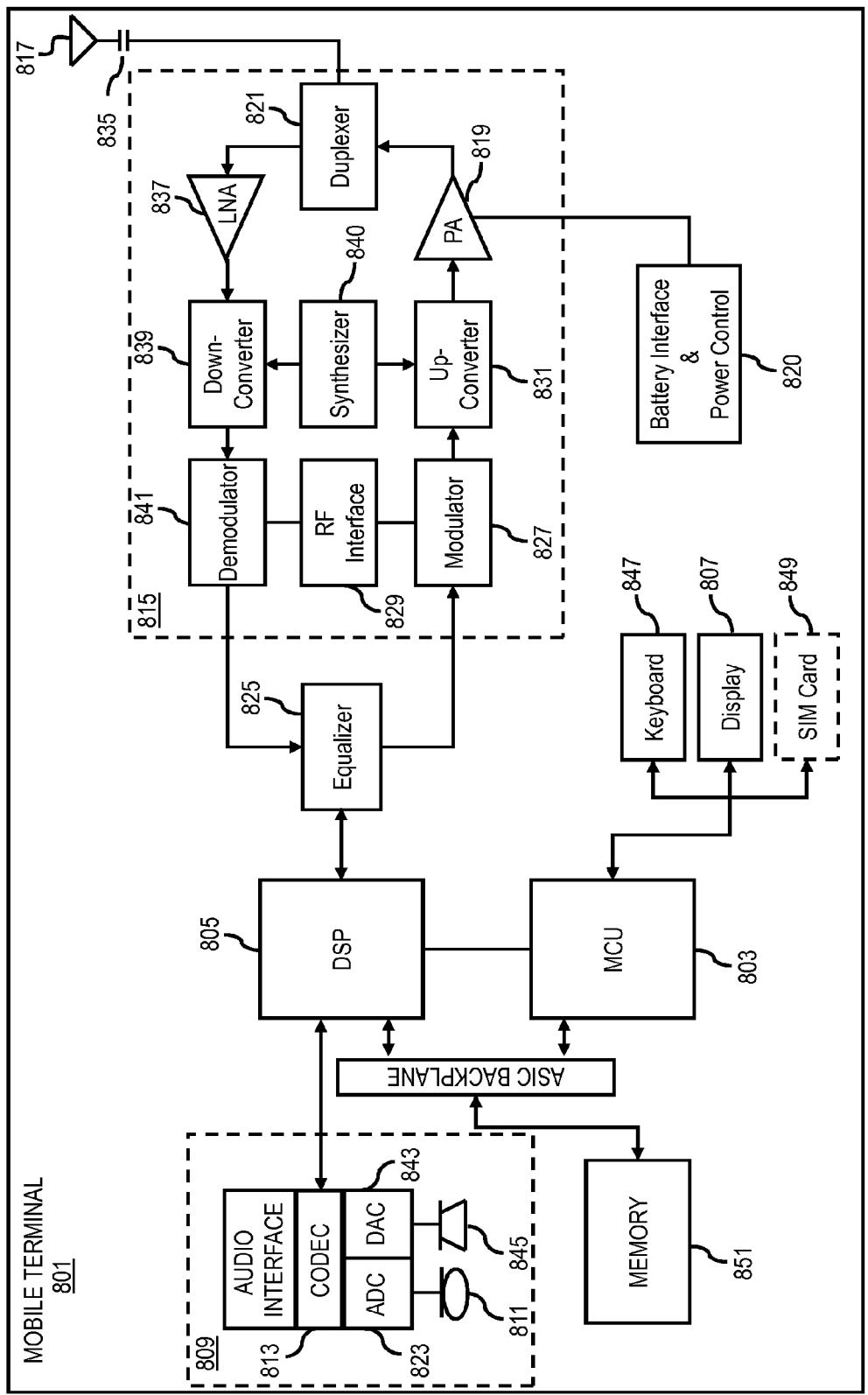
FIG. 8 is a diagram of a mobile station (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing proxy-based access controls. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing proxy-based access controls. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide proxy-based access controls. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by an apparatus, a designation of at least one monitoring client of a proxy server;
   receiving, by the apparatus, an input for associating one or more accessing clients with the at least one monitoring client;
   in response to receiving a request for accessing one or more resources from one of the accessing clients, initiating, by the apparatus, a presentation on an user interface associated with the one accessing client of a prompt to send to the at least one monitoring client a request for lifting an access policy, an access list, or a combination thereof that deny the request for accessing, wherein the prompt specifies the at least one monitoring client;
   initiating, by the apparatus, a modification of content to be delivered from the one or more resources to the one or more accessing clients based, at least in part, on one or more capabilities or characteristics associated with the one or more accessing clients;
   generating, by the apparatus, respective access histories for the one or more accessing clients; and
   providing, by the apparatus, access to the respective access histories to the at least one monitoring client via the proxy server,
   wherein the at least one monitoring client manages, remotely from the proxy server, access to the one or more resources of the proxy server by the one or more accessing clients, and
   wherein the at least one monitoring client and the one or more accessing clients are peer clients of the proxy server.

2. A method of claim 1, further comprising:
   receiving another input, from the at least one monitoring client, for specifying one or more access policies, one or more access lists, or a combination thereof with respect to the one or more resources that include the access policy and the access list; and
   in response to receiving the request for lifting the access policy, the access list, or a combination thereof, initiating a presentation on an user interface associated with the at least one monitoring client of a prompt for overriding the access policy, the access list, or a combination thereof, wherein the prompt specifies the one accessing client.

3. A method of claim 2, further comprising:
   receiving an input in response to the prompt for overriding; and overriding the access policy, the access list, or a combination thereof to allow the one accessing client to access the at least one of the one or more resources,
   wherein the one or more access policies are specific to all or a subset of the one or more accessing clients.

4. A method of claim 2, further comprising:
   processing the one or more access policies, one or more default access policies, or a combination thereof to determine whether to grant or deny the request for accessing,
   wherein the access policy, the access list, or a combination thereof deny access to one or more malicious web services by the one or more accessing clients.

5. A method of claim 4, further comprising:
   initiating a transmission of a notification to the one accessing client of an approval for the request for accessing,
   wherein whether to grant or deny the request for accessing is further determined based, at least in part, on the approval.

6. A method of claim 1, further comprising:
   initiating a presentation on the user interface associated with the at least one monitoring client of the respective access histories;
   receiving one or more user selections of websites in the respective access histories; and
   including the websites in the one or more access policies, the one or more access lists, or a combination thereof to respectively deny the one or more accessing clients to access the websites,
   wherein the respective access histories include, at least in part, a web history, a call history, a text messaging history, a bandwidth usage history, or a combination thereof.

7. A method of claim 1, further comprising:
   providing access to context information associated with the one or more accessing clients to the at least one monitoring client via the proxy server.

8. A method of claim 1, further comprising:
   receiving a text message, an account name, a unique identifier, or a combination thereof that identifies the at least one monitoring client, the one or more accessing clients, or a combination thereof at the proxy server,
   wherein the apparatus is embedded the proxy server.

9. An apparatus comprising:
   at least one processor; and
   at least one memory including computer program code for one or more programs,
   the at least one memory and the computer program code configured to, with the at least one processor, cause the apparatus to perform at least the following,
   determine a designation of at least one monitoring client of a proxy server;
   receive an input for associating one or more accessing clients with the at least one monitoring client;
   in response to receiving a request for accessing one or more resources from one of the accessing clients, initiate a presentation on an user interface associated with the one accessing client of a prompt to send to the at least one monitoring client a request for lifting an access policy, an access list, or a combination thereof that deny the request for accessing, wherein the prompt specifies the at least one monitoring client;
   initiate a modification of content to be delivered from the one or more resources to the one or more accessing clients based, at least in part, on one or more capabilities or characteristics associated with the one or more accessing clients;

generate respective access histories for the one or more accessing clients; and provide access to the respective access histories to the at least one monitoring client via the proxy server, wherein the at least one monitoring client manages, remotely from the proxy server, access to the one or more resources of the proxy server by the one or more accessing clients, and wherein the at least one monitoring client and the one or more accessing clients are peer clients of the proxy server.

10. An apparatus of claim 9, wherein the apparatus is further caused to:

receive another input, from the at least one monitoring client, for specifying one or more access policies, one or more access lists, or a combination thereof with respect to the one or more resources that include the access policy and the access list.

11. An apparatus of claim 10, wherein the one or more access policies are specific to all or a subset of the one or more accessing clients.

12. An apparatus of claim 10, wherein the apparatus is further caused to:

process the one or more access policies, one or more default access policies, or a combination thereof to determine whether to grant or deny the request for accessing.

13. An apparatus of claim 12, wherein the apparatus is further caused to:

initiate a transmission of a notification to the one accessing client of an approval for the request for accessing, wherein whether to grant or deny the request for accessing is further determined based, at least in part, on the approval.

14. An apparatus of claim 9, wherein the respective access histories include, at least in part, a web history, a call history, a text messaging history, a bandwidth usage history, or a combination thereof.

15. An apparatus of claim 9, wherein the apparatus is further caused to:

provide access to context information associated with the one or more accessing clients to the at least one monitoring client via the proxy server.

16. An apparatus of claim 9, wherein the apparatus is further caused to:

receive a text message, an account name, a unique identifier, or a combination thereof to identify the at least one monitoring client, the one or more accessing clients, or a combination thereof at the proxy server.

17. A non-transitory computer-readable storage medium carrying one or more sequences of one or more instructions that, when executed by at least one processor, cause an apparatus to at least perform the following steps:

determining a designation of at least one monitoring client of a proxy server;

receiving an input for associating one or more accessing clients with the at least one monitoring client;

in response to receiving a request for accessing one or more resources from one of the accessing clients, initiating a presentation on an user interface associated with the one accessing client of a prompt to send to the at least one monitoring client a request for lifting an access policy, an access list, or a combination thereof that deny the request for accessing, wherein the prompt specifies the at least one monitoring client;

initiating a modification of content to be delivered from the one or more resources to the one or more accessing clients based, at least in part, on one or more capabilities or characteristics associated with the one or more accessing clients;

generating respective access histories for the one or more accessing clients; and providing access to the respective access histories to the at least one monitoring client via the proxy server, wherein the at least one monitoring client manages, remotely from the proxy server, access to the one or more resources of the proxy server by the one or more accessing clients, and wherein the at least one monitoring client and the one or more accessing clients are peer clients of the proxy server.

18. The non-transitory computer-readable storage medium of claim 17, wherein the apparatus is caused to further perform:

initiating a modification of content to be delivered to the one or more accessing clients based, at least in part, on one or more capabilities or characteristics associated with the one or more accessing clients;

generating respective access histories for the one or more accessing clients; and providing access to the respective access histories to the at least one monitoring client via the proxy server.

* * * * *